INVENTORS
GÜNTHER STRÖCKER
GERHARD FISCHER
BY

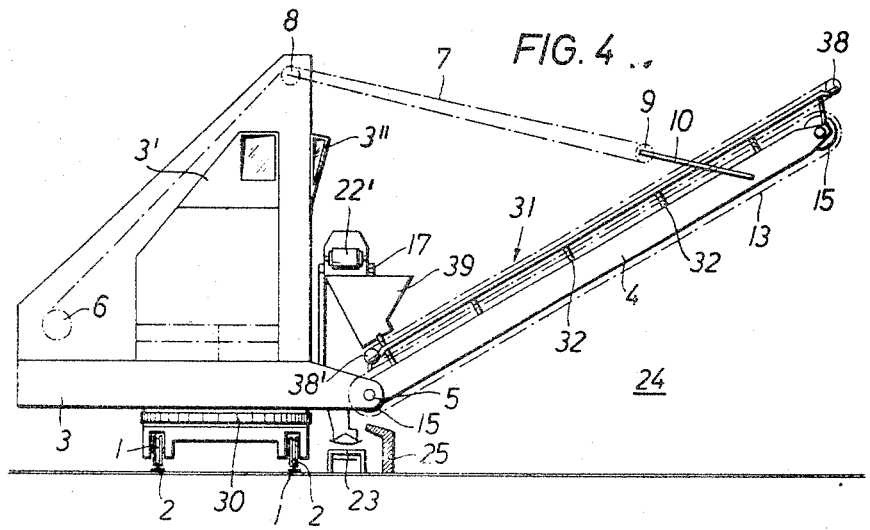
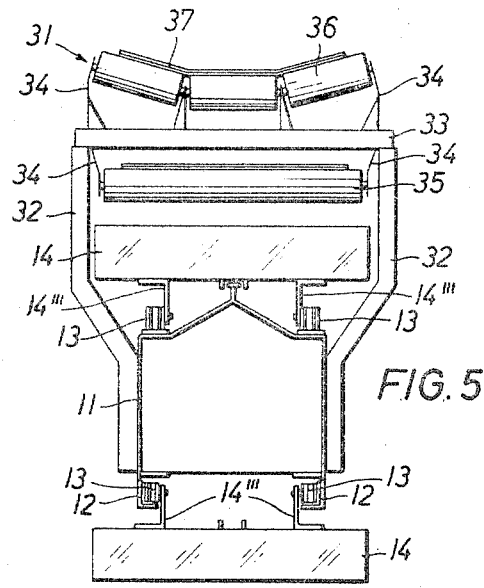

# United States Patent Office 3,487,910
Patented Jan. 6, 1970

3,487,910
SCRAPER AND CONVEYOR APPARATUS
Günther Ströcker, Dortmund-Schuren, and Gerhard Fischer, Dortmund-Kirchhorde, Germany, assignors to Maschinenfabrik Gustav Schade, Dortmund, Germany, a company of Germany
Filed July 3, 1967, Ser. No. 650,884
Claims priority, application Germany, July 7, 1966, M 70,147
Int. Cl. B65g 65/28
U.S. Cl. 198—36                    3 Claims

ABSTRACT OF THE DISCLOSURE

An apparatus for scraping and conveying bulk goods, such as coal, earth, gravel, or other granular material is disclosed. The scraper conveyor comprises a cantilevered arm and is provided with an endless conveyor belt which is movable along with the cantilevered arm.

---

The present invention relates in general to a machine having a cantilever arm with a scraper conveyor mounted thereon. The cantilever is preferably pivotably mounted on supporting means, such as a under-carriage or the like which is provided with driven wheels running on tracks or with a caterpiller drive.

Loading machines of the scraper conveyor type are commonly used in place of dredgers, excavator cranes, shovel dredgers and other similar devices for removing bulk goods, such as coal, fertilizer, sand or other granular materials from silos or dumps. These loading machines are preferably used because of their ability to perform in a continuous mode of operation and their ability to cover a wide area with the cantilever arm.

Moreover, during the removal operation, the cantilever arm permits a mixing of bulk goods which may be stored in stacked layers of different properties. Furthermore, clammy bulk goods may be easily removed by means of the scraper conveyors and then disposed in a fine granulated form.

The known machines referred to, which are provided with cantilever arms and scraper conveyors mounted thereon are used solely for the removal of bulk goods from their storage area or the like. For the storage of bulk goods in open area dumps, special conveyor devices such as endless belts arranged on belt-bridges or on cantilevers of storing machines, must be used. It is apparent that the use of separate equipments for storage of the bulk goods and for discharging or removing of the stored bulk goods causes high costs for the plant.

It is, therefore, an object of the present invention to overcome the above mentioned shortcoming by providing a machine of the scraper conveyor type which may be used for the removal as well as for the storage of bulk goods without the necessity of providing two separate equipments for the removal and the storage operation.

Briefly, in accordance with the present invention, this objection is achieved by providing the pivotally-mounted cantilever arm of the scraper conveyor with conveyor means which are capable of storing bulk goods into silos or dumps or the like.

This object is further achieved by providing a simple constructional arrangement wherein the upper portion of the cantilever arm is provided with or formed as a trough in which the scrapers of the endless scraper conveyor are guided back from the drum near the swivel point of the cantilever to the drum adjacent the free head end of the same in such a manner, that they are able to scrape and convey the bulk goods to be stored on the upper side of the cantilever in the longitudinal direction of the same towards the free head end of the cantilever where they are discharged into the silo or the dump. It is thereby possible to utilize the upper portion of the cantilever arm as a chain conveyor for storing bulk goods and to use the lower portion of the cantilever arm as a scraper conveyor for removing bulk goods stored in a silo or a dump. The charging of the continuous scraper conveyor at the upper portion of the cantilever is carried out by the use of a suitable feeding device, preferably a belt conveyor the belt strap of which running at the upper side is guided in loops over a plurality of drums or rollers arranged in a car which is running with wheels on tracks. The discharge of the bulk goods to be stored may take place at chain drum mounted on the head end portion of the cantilever arm or through an opening in the bottom of the trough in which the continuous scraper chains run. The opening is suitably arranged near the free head end portion of the cantilever arm.

The advantage derived from the latter arrangement is that the lower portion of the cantilever arm with the scrapers moving from the free head end portion of the cantilever arm to the chain drum mounted at or near the pivot point of the cantilever arm may remove the bulk goods across the whole width of the total storage area, while the storing of the goods may be performed in the center of the storage area so that a symmetrical cone is formed in the center of the storage area. Previously, this could only be achieved by rotating the cantilever arm about a vertical axis. The discharging of the bulk goods to be stored which is carried out through the opening near or in some distance from the head end portion of the cantilever arm obviates the need for rotating the cantilever arm. Accordingly, it is apparent that this type of construction is advantageous from the constructional point of view as well as from the economical point of view.

In accordance with a further feature of the invention, the cantilever arm of the scraper conveyor is provided with a special belt conveyor for storing bulk goods wherein the frame of the cantilever arm forms the support for the conveyor belt. Preferably, the conveyor belt is attached to the upper portion of the scraper conveyor and is arranged parallel thereto on the cantilever arm. The conveyor belt may also be arranged laterally and parallel to the scraper conveyor on the cantilever arm.

As the angle of inclination of the conveyor belt for storing the bulk goods is limited to 20°, it is necessary in certain cases to swivel or pivot the cantilever arm laterally in order to reach the highest point of the dump. However, the lateral pivoting of the cantilever arm may be avoided if, in accordance with the invention, the conveyor belt is arranged on the cantilever arm so that the angle of inclination of the conveyor belt in the conveying direction is less than the angle of inclination of the cantilever arm. In this manner, the point of disposal from the conveyor belt onto the dump area may be raised to a higher level, without the conveyor belt exceeding an angle of inclination of 20°.

It is to be recommended that the place of disposal of the bulk goods be located at the storage area in a manner such that the center of the storage area is located directly beneath the point of disposal of the conveyor belt.

The invention is explained in greater detail in the following description taken in connection with the attached drawings wherein a number of embodiments of the inventive scraper conveyor are shown.

In the drawings wherein similar reference characters denote similar elements throughout the several views:

FIG. 4 is a side view of a second embodiment of a scraper conveyor according to this invention;

FIG. 5 is a vertical sectional view of the scraper conveyor as shown in FIG. 4.

Figure 1:
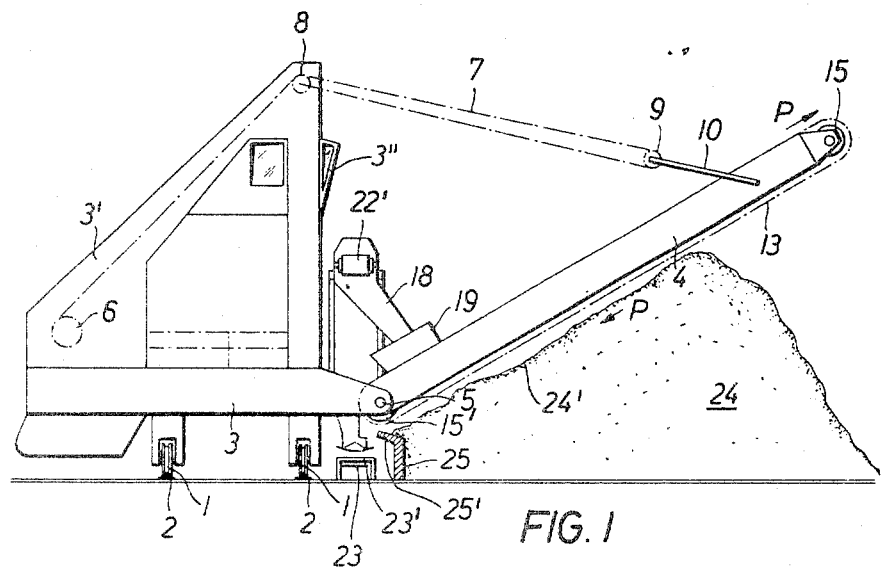
FIG. 1 is a side view of one embodiment of the scraper conveyor of this invention.
Figure 2:
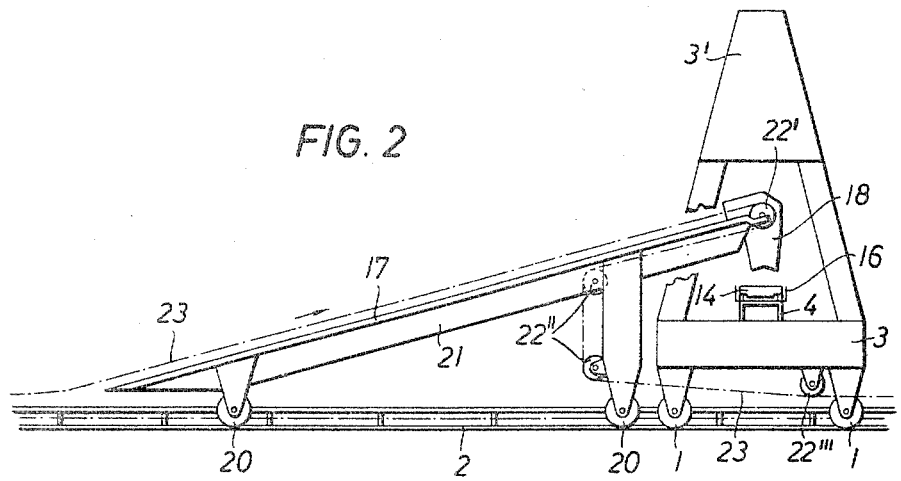
FIG. 2 is a side view of the scraper conveyor of FIG. 1, viewed from the left, illustrating the conveyor belt for charging the scraper conveyor.
Figure 3:
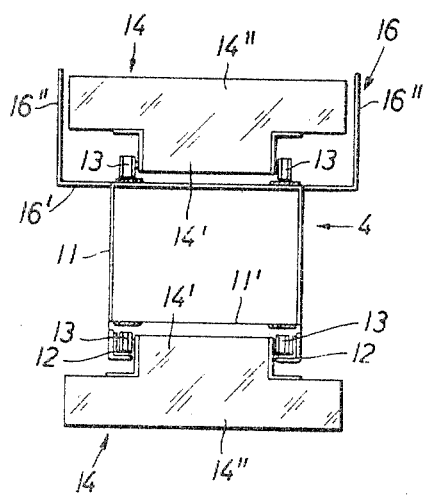
FIG. 3 is a vertical sectional view of the cantilever arm according to the invention as shown in FIGS. 1 and 2.
Figure 3A:
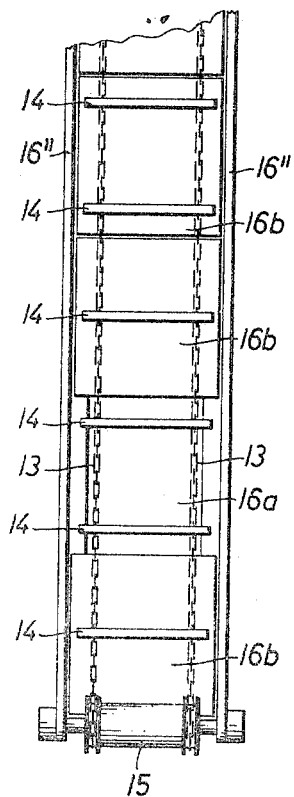
FIG. 3a is a plan view of a portion of trough of the cantilever arm.

The machine illustrated in FIGS. 1–3 comprises a housing or a support plate, such as a undercarriage 3 movably mounted on tracks 2 by means of driven wheels or rollers 1 and supporting a housing 3' with a operator's cabin 3". A boom or cantilever arm 4 is provided on the undercarriage 3 and is mounted for rotation in a vertical plane about a pivot axis 5. The swinging motion of the cantilever arm 4 is accomplished by a lifting means, such as a winch 6 arranged in the machine housing 3'. The cable 7 of the motor-driven winch 6 is arranged around a roller 8 on the top of the housing 3' and a roller 9 mounted at one end of a swinging arm 10. The end of the cable 7 is attached near the roller 8. Cable 7 thereby connects the swinging arm 10 which is pivotally connected at its other end to the cantilever arm 4 to winch 6 so that the cantilever arm may be lowered and raised by means of the cable 7 and the winch 6.

As shown in FIG. 3 the cantilever arm 4 comprises a box-like support or frame 11 the underside of which is provided with angle irons 12 arranged parallel and extending substantially over the whole length of the cantilever arm. The angle irons 12 serve as sliding guides for the lower portions of two parallel endless conveyor chains 13. Scrapers 14 are mounted between and connected with the conveyor chains 13 in short distances in any suitable manner, such as by means of screw bolts or the link. The scrapers are metal plates with T-form the short legs 14' of which are coupled with the conveyor chains 13 in such a manner that the broad bridge portion 14", on the lower portion of the cantilever arm, extend downwards and sideways from the chain guides 12. For driving and guiding the conveyor chains 13 pulleys or chain drums 15 and 15' (FIG. 1) are mounted on each end of the cantilever arm 4. A drive motor (not shown) is preferably mounted on the undercarriage 3 or the cantilever arm to drive the pulley 15' mounted at the fulcrum of the cantilever arm so that the chains 13 together with the scrapers may run around the cantilever arm, lengthwise thereof, in the direction as shown by arrows P. Mounted on the support frame 11 of the cantilever arm 4, on the upper portion thereof, is a channel or trough 16 which is opened on the upper side and which has, as seen in FIG. 3, a rectangular section with a bottom plate 16' welded with the box-like frame 11 and with two side walls 16", so that the scrapers 14 on the upper side of the cantilever arm are guided within the trough 16. In this manner the return or upper portion of the endless chains 13 and the scrapers coupled therewith forms, together with the trough 16, a scraper conveyor with the scrapers 14 acting as grippers or catches. It is so possible to transport bulk goods to be stored in the trough provided at the upper portion of the cantilever arm 4 from a feeding point near the pivot axis 5 to the discharging point at or near the head end portion of the cantilever arm.

The charging of the scraper conveyor is carried out by a belt conveyor 23 mounted with its frame 23' at the side of the tracks 2 behind a wall 25 defining the dump 24. Running on the tracks 2 by means of wheels 20 is a conveyor carrier or belt car 17 having an inclined conveyor ramp 21 and pulleys or belt drums 22' and 22" rotatably mounted on the frame of the belt car 17 so that the upper portion of the endless belt 23 is deflected by the ramp 21 from the horizontal plane in the direction towards the drum 22' arranged directly above a charging chute 18, which guides the bulk goods to be stored into a funnel 19 mounted on the cantilever arm above the trough 16. As indicated by a dot-dash line in FIG. 2 the belt 23 is guided around the drum 22' with an angle of about 180° to the drums 22" and over a roller 22''' mounted on the undercarriage 3 back into the horizontal plane.

For removing the stored bulk goods the cantilever arm 4, by means of the winch 6 and the cable 7, is lowered towards the dump so that the scrapers 14 are able to work on the slope 24' of the dump whereby the scraper conveyor is driven in such a manner (arrow P) that the scrapers 14 in the working position of the cantilever arm 4 can take along and convey the bulk goods toward the wall 25 and the conveyor belt 23. To facilitate the conveying of the bulk goods moved from the scrapers to the upper portion of the belt 23 for removal the wall has a inclined portion 25' forming a gliding plane for the bulk goods. During the removal operation of the bulk goods, cantilever arm 4 is moved together with the belt car 17 along tracks 2 in a longitudinal direction of the storing area.

When the bulk goods are to be stored, the goods are conveyed by conveyor 23 into charging chute 18 and funnel 19 and from there in the trough 16 of the cantilever arm. The bulk goods are then conveyed by means of the continuously moving scrapers 14 in the direction of the head end portion of the cantilever arm 4 which extends over the dump area. The bulk goods are disposed onto the dump by being discharged over the chain drum 15.

The bulk goods may also be disposed of through an opening 16a of the bottom 16' of the trough 16 provided just before the drum 15. The bulk goods would be dropped through this opening and through a opening 11' on the lower portion of the box-like frame 11 of the cantilever arm. In order to dispose of the bulk goods at any given location of the scraper conveyor the bottom 16' of the trough would consists of a plurality of plate sections 16b arranged longitudinally with respect to the direction of cantilever arm 4. The bottom plates 16b may be selectively removed to form an opening in the bottom where desired for discharging the bulk goods.

The machine shown in FIGS. 4 and 5 correspond substantially to the machine shown in FIGS. 1–3, with the exception of the structural arrangement of the boom or cantilever arm 4. It should be noted that the housing 3' together with the cantilever arm 4 is mounted on a rotatable wheel 30 which is rotatable about a vertical axis.

The cantilever arm 4 comprises a box-like support or boom 11 which is provided with angle irons 12 at the lower side thereof to form guides for the two endless chains 13 carrying scrapers 14. The scrapers 14 are connected with angle members 14''' which are coupled with the chains by means of bolts or the like. Roller supports 32 are mounted on the side walls of support 11 which in turn support struts 33. Bearing brackets, mounted on the struts 33, carry support rollers 35 and 36 at the lower and upper portion of a endless conveyor belt 37, respectively. The endless conveyor belt 37 is guided and driven by a pulley or drum 38' rotatably mounted on a axis coaxial with the pivot axis 5 of the cantilever arm. A further pulley or drum 38 is arranged at the head portion of the cantilever arm 4 so that the bulk goods may be freely discharged onto dump 24 at a point of the cantilever arm extending a short distance over the drum 38.

The charging of the trough-shaped upper portion of the storing belt 31 is performed in a similar manner as that described with respect to the embodiment shown in FIGS. 1–3; that is by means of the belt conveyor 23, the belt car 17 and a charging chute 39.

It is to be understood that conveyor 31, which is mounted on the cantilever arm 4, requires drive means which would be independent from the drive means for the scraper conveyor of cantilever arm 4. Such a drive means would preferably be arranged in the vicinity of pivot axis 5.

During the storing of the bulk goods, the machine is moved in longitudinal direction with respect to dump 24, or if the machine is in a stationary position, the cantilever arm 4 would be rotated about the vertical axis. Due to the rotatable capacity of cantilever arm 4, a second dump located at the other side of the machine, or opposite dump 24, could be serviced. For this purpose an additional conveyor arrangement 17, 23 would be provided for the second dump.

Figure 6:
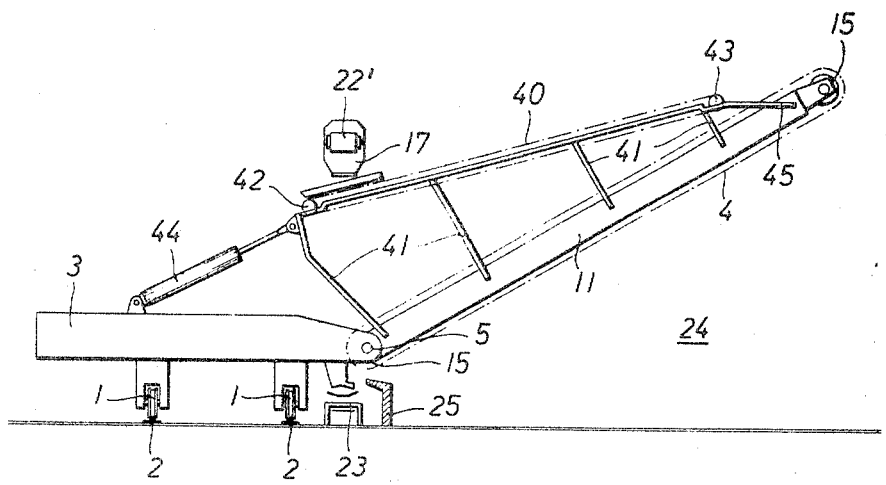
FIG. 6 is a third embodiment of the scraper conveyor according to this invention.

FIG. 6 shows a third embodiment of the machine wherein undercarriage or support 3 is mounted on rollers 1 and on tracks 2, and is provided with a rotatable cantilever arm 4. It should be noted that in this embodiment, the angle of inclination of cantilever arm 4 or the scraper conveyor is larger with respect to the horizontal than the angle of inclination of the conveyor belt 40 mounted thereon. A conveyor system is arranged on the boom or support 11 of cantilever arm 4 wherein pulleys or drums 42 and 43 are mounted in such a manner so that the vertical distance of drum 42 from the scraper conveyor is substantially larger than the vertical distance from the scraper conveyor of drum 43 which is mounted on the head position of cantilever arm 4. In this manner, it is possible for the conveyor belt 40, used for feeding the bulk goods to the dump, to be positioned at a higher level of the disposal point over the storage area than may be achieved with the scraper conveyor described in FIGS. 4 and 5 by maintaining the same angle of inclination as shown in that embodiment.

The disposal or discharging of the bulk goods takes place in the area of pulley 43 mounted in the front section of the head portion of cantilever arm 4 and over a feeding chute 45. The charging of conveyor belt 40 is carried out in the same manner and with the same feeding and removal conveyor system 23 as previously described above.

The lifting and lowering of cantilever arm 4 is preferably actuated by means of a plurality of hydraulic cylinders 44 mounted on support 3. The piston rods of hydraulic cylinders 44 engage support construction 41 of the belt conveyor 40 and support construction 41 serves as a tension member for lifting and lowering cantilever arm 4.

It is to be understood that the present invention is not to be limited to the embodiments described in this specification, but may be used with any known type of scraper conveyors. For instance, the scraper conveyor may be mounted on a caterpillar tractor. It is also possible to provide the scraper conveyor, as described, with two cantilever arms 4 wherein the two cantilever arms would be arranged at an angle of 180° with respect to each other for balance purposes.

While only a few embodiments of the present invention have been shown and described, it will be understood that many changes and modifications may be made thereto without departing from the spirit and scope of the invention as defined by the appended claims.

What is claimed is:

1. A machine for the removal and storage of bulk goods from a dump area and the like, and for receiving bulk goods from a charging conveyor comprising:
   supporting means,
   a cantilever arm pivotally mounted to said supporting means for movement over said dump area,
   an endless scraper conveyor mounted to said cantilever arm having a plurality of spaced-apart interconnected scrapers for the removal of bulk goods from the slope of the dump and the like to convey said goods in a direction toward said supporting means, and for receiving bulk goods from said charging conveyor for delivering to said dump area, and
   a conveyor belt mounted on said cantilever arm above said scraper conveyor, said conveyor belt being disposed at an inclined angle with respect to said scraper conveyor whereby the angle of inclination of said conveyor belt is less than the angle of inclination of said scraper conveyor.

2. The machine as recited in claim 1, additionally comprising a support construction for mounting said conveyor belt above said cantilever arm.

3. The machine as recited in claim 2, additionally comprising piston means mounted on said supporting means and coupled to said support construction for lifting and lowering said cantilever arm.

References Cited

UNITED STATES PATENTS

| | | | |
|---|---|---|---|
| 685,026 | 10/1901 | Bell | 198—139 |
| 892,593 | 7/1908 | Keller | 198—174 |
| 2,670,070 | 2/1954 | Decat | 198—174 |
| 3,351,180 | 11/1967 | Herzog | 198—205 |
| 570,876 | 11/1896 | Le Grand | 198—36 XR |
| 1,311,298 | 7/1919 | Stuart. | |
| 2,769,526 | 11/1956 | Herscovitch | 198—75 |
| 3,297,141 | 1/1967 | Janitsch et al. | 198—36 XR |

RICHARD E. AEGERTER, Primary Examiner

U.S. Cl. X.R.

198—75